Oct. 22, 1957　　　N. E. LAUTERBACH　　　2,810,196
DENTAL UNIT

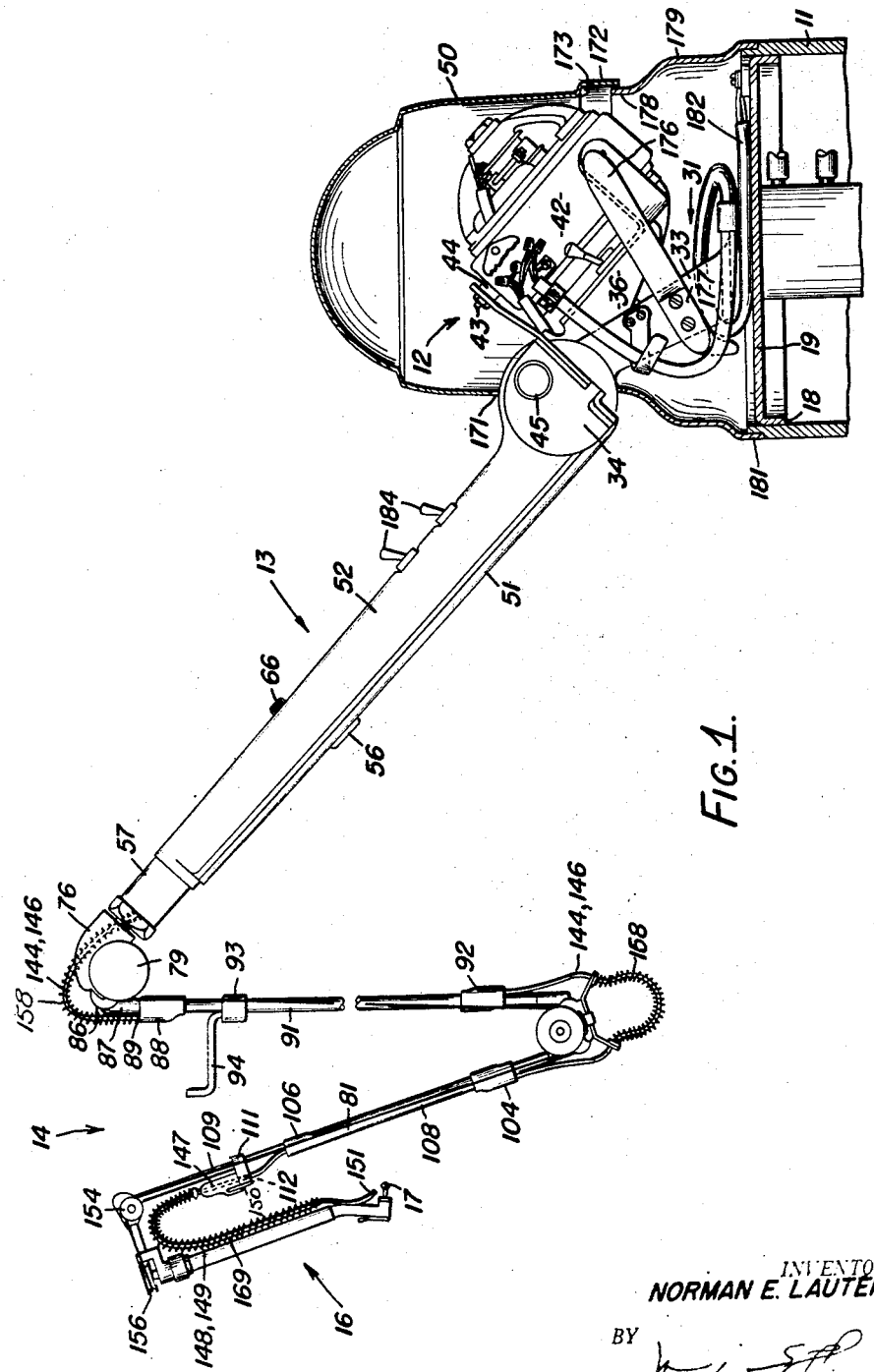

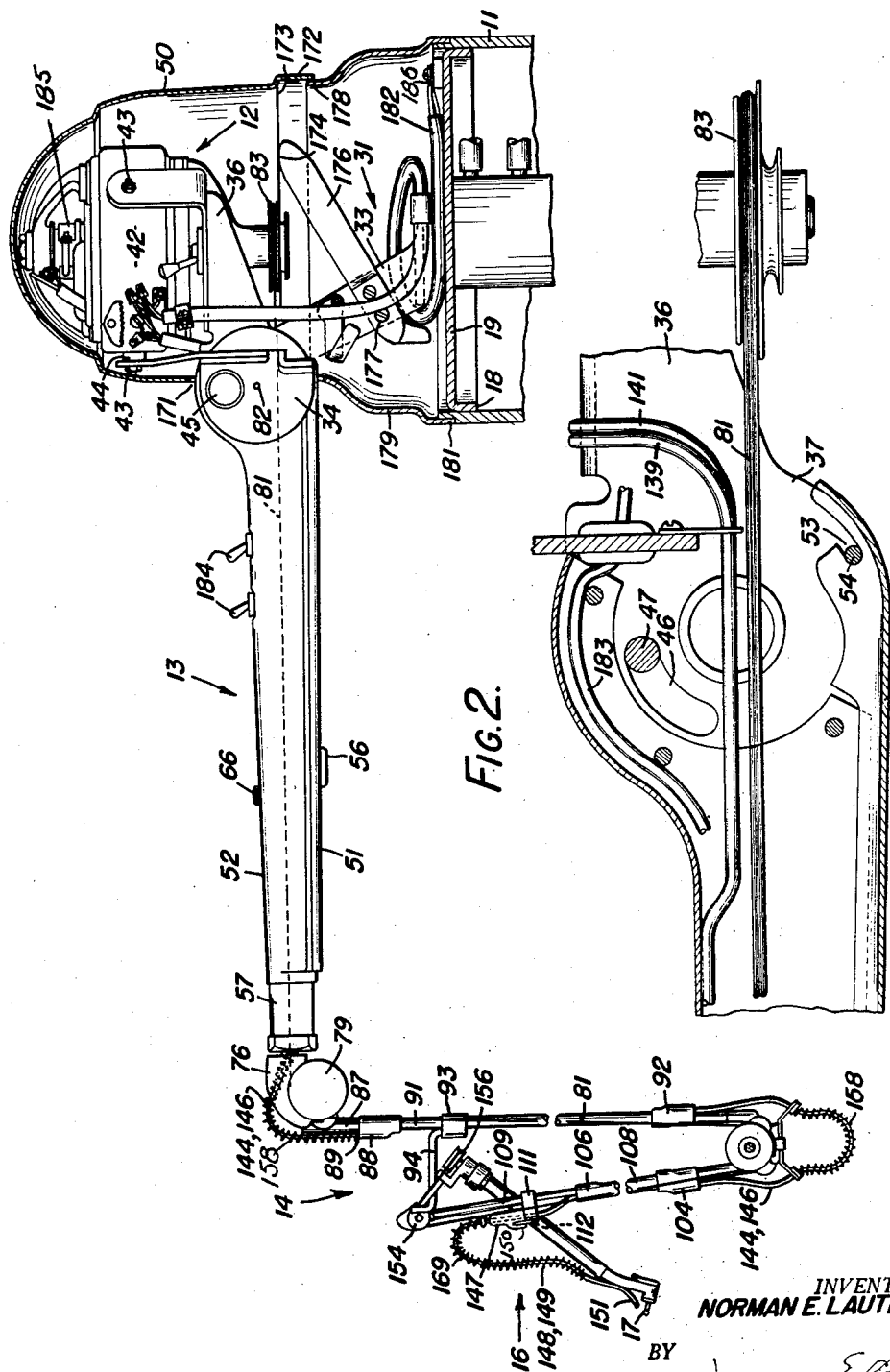

Filed Jan. 9, 1956　　　　　　　　　　　4 Sheets-Sheet 3

INVENTOR.
NORMAN E. LAUTERBACH
BY
ATTORNEY

Oct. 22, 1957 N. E. LAUTERBACH 2,810,196
DENTAL UNIT
Filed Jan. 9, 1956 4 Sheets-Sheet 4
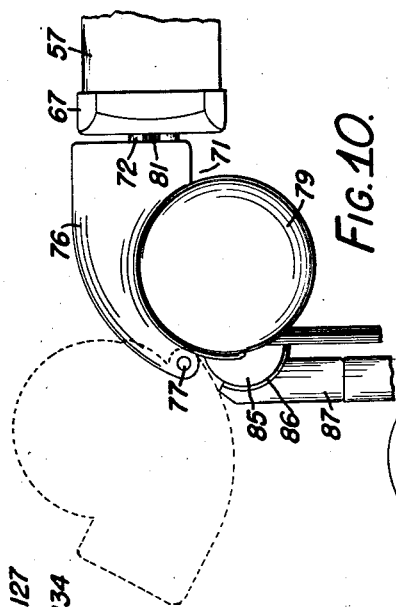
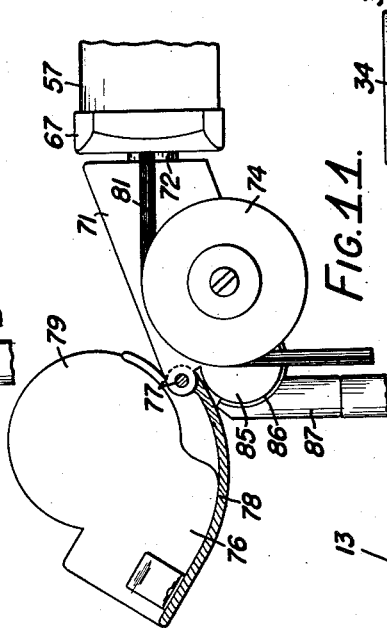
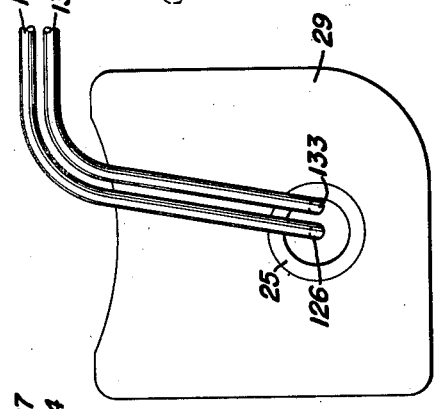
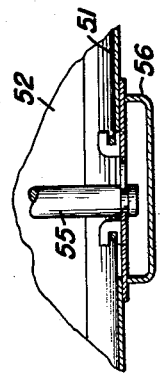
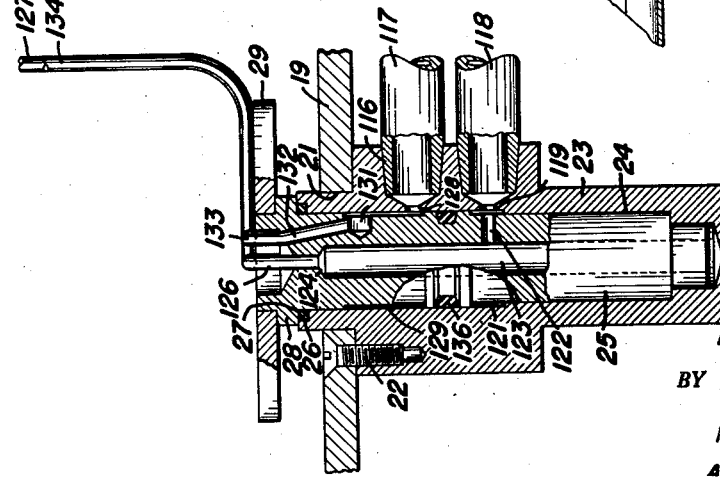
INVENTOR.
NORMAN E. LAUTERBACH
BY
ATTORNEY United States Patent Office 2,810,196
Patented Oct. 22, 1957

2,810,196

DENTAL UNIT

Norman E. Lauterbach, Pittsford, N. Y., assignor to Ritter Company, Inc., Rochester, N. Y., a corporation of Delaware Application January 9, 1956, Serial No. 557,892

22 Claims. (Cl. 32—23)

This invention relates to dental units or equipment stands and more particularly to that portion of the dental unit which is concerned with the drill, the so-called dental engine for driving the drill and parts associated with these elements.

In the dental engine and dental engine mountings of the prior art, it was the practice to mount the dental engine and the dental arm and its appendages on opposite sides of a horizontally extending pivot. The arm and its appendages and the dental engine then counterbalanced each other and by properly proportioning the length of the arm supporting the dental engine to the length of the dental arm and taking into consideration the weights on opposite sides of the horizontally extending pivot an almost perfect counterbalance could be achieved. Such an arrangement of parts is shown in Pieper et al. Patents No. 1,340,908, issued May 25, 1920, and 1,434,793, issued November 7, 1922. For a great many years the dental engine mounting of these patents represented a standard commercial construction sold in large quantities and to this day some manufacturers still employ essentially the same structure shown in these patents.

More recently some manufacturers have sought to enclose the dental engine and appurtances thereto such as electrical leads, in a housing to protect these parts from dust and accidental damage but more importantly to improve the aesthetic appearance of the dental unit. Such efforts have resulted in the achievement of these objectives but in the loss of the inherent counterbalancing advantages of the unit of the Pieper et al. patents. The counterbalance was and still is of prime importance to the dentist. In the units with enclosed dental engines either a counterbalance is omitted entirely and dependence is placed upon friction or an inadequate and inaccurate spring counterbalance is provided. The essence of this feature of my present invention is to retain the inherent advantages of the Pieper construction wherein the dental engine and the dental arm and its appendages couterbalance each other and so constructing and arranging the engine and its associated parts so that the engine and its associated parts may be enclosed.

An object of the invention is to provide a dental engine unit and mounting therefor which is more convenient to use, more accessible for repair and adjustment and in which most of the parts are enclosed and protected from dust and accidental damage.

Another object of the invention is to provide a simplified and improved means for bringing fluid, in this case both air and water, from the dental unit to the rotary drill.

Another object of the invention is to provide means for protecting the tubular elements which carry fluids, in this case both air and water to the hand piece, from being engaged and damaged by the usual moving belt or cord which extends from the dental engine to the drill for driving the same.

A further object of the invention is to provide means whereby the various articulated joints between the tool arm and the rotary drill may freely articulate while the tubular elements which carry air and water to the hand piece are fully protected from being cut by the drive belt for the drill.

Still another object of the invention is to provide means whereby the dental tool arm and the members between the end of the arm and the drill are pivoted with respect to and substantially counterbalanced by the motor and its support and frame without the use of a spring or a weight counterbalance, the horizontally extending pivot being located at or adjacent a position outside the housing or cover which encloses the motor and its associated parts whereby means may be provided externally of the housing for adjusting the friction at the pivot point to the end that the arm will stay in any particular position of adjustment desired and yet may be freely shifted when the dentist desires to raise or lower the arm.

This invention further contemplates a dental engine arm adapted to swing both horizontally and vertically wherein the arm and its appurtenances are substantially counterblanced by the engine, its support and frame by locating the horizontal pivot axis between these sets of elements, the motor being arranged in an upside down position with the drive pulley for the rotary drill located on the lower side of the motor whereby the drive belt may pass substantially through the horizontal pivot axis and be substantially entirely enclosed within the arm.

A particularly important aspect of the invention lies in the fact that with the horizontally extending pivot being, for practical purposes, located outside the hood or cover which encloses the dental engine and its associated parts: the cover requires only a minimum opening to accommodate the arm; the cover need rotate only about a vertical axis thereby avoiding the necessity of providing a universal joint with its attendant problems between the cover and its adjacent parts; and the cover need not be supported by the swingable dental engine or its supporting frame and, therefore, may be removed to allow inspection of the dental engine and other parts within the cover by merely lifting the cover and without removing any screws.

In addition, the invention contemplates the provision of a dental engine unit and appurtenances thereto in which the dental arm comprises two hollow telescopic members through which the belt for driving the rotary drill freely passes and through which the tubes for carrying air and water to the hand piece pass, means being provided for adjusting the relationship of the telescopic parts to adjust the tension on the belt without adversely affecting the tubes for carrying air and water to the hand piece.

Other objects and advantages of my invention will be set forth in the appended claims and will be apparent from the following description, when taken in connection with the accompanying drawings, in which:

Fig. 1 is a side elevation of the top portion of a dental unit showing the dental engine, dental arm and the connections to the hand piece, together with the drive belt for the rotary drill and tubular means for bringing air and water to the hand piece, the dental arm being shown in a position approximately intermediate its upper and lower positions of vertical swinging movement and the protective hood or cover being shown broken away to enable a showing of the motor and its associated parts;

Fig. 2 is a view similar to Fig. 1 with the arm in its lowermost position and the hand piece hung on its support bracket in the position of non-use;

Fig. 4 is a vertical sectional view of the center post and its support about which the center post pivots, the view also showing the air and water connections;

Fig. 5 is a top plan view of Fig. 4;

Fig. 6 is a view showing the underside of the dental arm with cover removed;

Fig. 7 is a sectional view taken through the horizontal pivot;

Fig. 10 is a view showing the connection between the end of the dental arm and the first articulated tubular member;

Fig. 11 is a view similar to Fig. 10 with the pulley cap pivoted to enable threading of the drive belt over the pulleys; and Fig. 12 is a sectional view showing one form of latch enabling removal of the cover from the underside of the dental arm.

Figure 8:
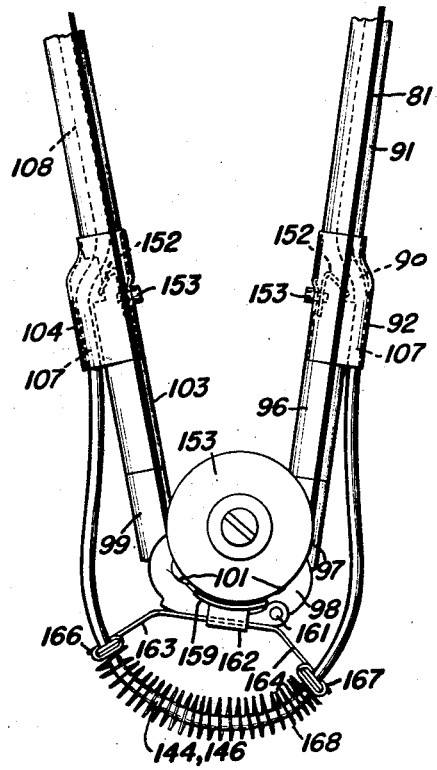
Fig. 8 is a view showing part of two of the articulated arms, showing the pulleys over which the drive belt passes and illustrating the means by which the tubes for carrying air and water to the hand piece are protected against being cut by the belt.

The dental unit in which this invention is incorporated as shown in Figs. 1 and 2 comprises a vertically extending hollow supporting column 11, a so-called dental engine or motor, generally indicated by the numeral 12, a dental arm, generally indicated by the numeral 13, a plurality of articulated tubular members, generally indicated by the numeral 14, a hand piece, generally indicated by the numeral 16, and a rotary drill 17.

The hollow supporting column 11, in addition to supporting the mechanism with which this invention is concerned, carries, as is well known in the art, a cuspidor bowl, usually a dental lamp, a swingable instrument table and various hand tools such as a dental mouth lamp, a cautery, a syringe and other instruments normally employed in the practice of dentistry. Suitably secured, as shown at 18, adjacent the top of the supporting column 11 is a plate 19 which has a central bore 21 (see Fig. 4). The plate 19 carries, by means of a plurality of screws 22, a socket member 23 which has a stepped bore 24 for the reception of a center post 25.

The center post 25 is suitably journaled in the bore 24 so as to be rotatable therein to form a vertical axis about which the dental engine, generally indicated by the numeral 12, and the dental arm 13 together with its appendages may swing in a horizontal plane. The upper end of the socket 23 has an enlarged annular bore 26 for the reception of an O ring packing 27 to form a seal between a shoulder 28 formed on the post 25 and the adjacent part of the socket member. A plate 29 is seated on the upper surface of the annular shoulder and rotates with the center post.

Secured to the plate 29 as by screws 30 (Fig. 3) is a support member or cradle 31 formed by two arms 33. The arms 33 extend upwardly and forwardly and have enlarged circular cap members 34 integral therewith the centers of which constitute the horizontal axis about which the dental arm 13 may be swung in a vertical plane. The dental engine has a frame which is carried by a motor bracket 36 which has forwardly extending portions 37. These forwardly extending portions are generally circular and are straddled by the cap members 34 of the arms 33. The motor frame 42 is carried by the bracket through the medium of nut and stud assemblies 43, there being provided rubber cushioning elements 44 for dampening the vibrations of the motor.

The portions 37 of the motor bracket 36 have arcuate slots 46 for the reception of a cross member 47. The cross member 47 is carried by the cap members 34 of the cradle 31, the ends of the slot serving as stops to limit the vertical swing of the dental arm 13 and the motor 12 about the horizontal axis. However preferably rubber bumpers (not shown) limit the movement of the arm prior to engagement of the ends of the slot. One end of the cross member 47 is anchored in one of the cap members by a screw (Fig. 3) and is extended through the other cap member. The extended end is threaded for the reception of a finger nut 45. The pivots between the motor bracket part 37 (Fig. 7) and the circular cap members 34 (Fig. 3) comprise a pair of circular elements pressed into circular recesses in the cap members upon which motor bracket parts 37 may rotate.

One important aspect of my invention lies in the fact that the horizontal pivot axis is external of the cap or hood 50 which encloses the motor and most of the supporting bracket. This places the finger nut 45 in an external position with respect to the hood so that upon adjusting the finger nut, the dentist may adjust the friction between the bracket parts 37 and the circular cap members 34. By adjusting the nut the dentist can apply sufficient friction so that the arm will stay in an adjusted position and yet be readily shiftable with a slight amount of force upon the hand piece. Adjustment of the friction between the parts, it will be particularly noted, can be done without removing the hood 50.

The dental arm 13 includes a sheet metal part 52 which is U-shaped in cross section with the open side of the U extending downward. This open side is closed by a sheet metal cover 51 one end of which is curved upward, as shown in Fig. 7, and provided with a slot 53 for the reception of a pin 54 which extends across between the parts 37 and through the U-shaped part 52 of the dental arm 13. The pin 54 and additional pins 54 tie the U-shaped part 52 to the parts 37 of the motor bracket. The outboard end of the cover 51 is carried by a pin 55 and slide clip 56 as shown (Fig. 12). Upon movement of the slide clip to disengage it from the pin, the cover 51 may be removed.

Referring now to Fig. 6 which is a view of the underside of the dental arm 13, the arm is further provided with a sheet metal tubular telescopic part 57 which telescopes within the main part of the arm and is partly held in position by tabs 58 bent downward and inward from the sheet metal part 52 to underlie the telescopic part 57. The underside of the sheet metal part 52 has soldered or otherwise secured thereto a guide 59 which provides a through opening for a threaded feed screw 61. A set screw 62 carried by a support 63 struck up from the sheet metal of the telescopic part engages a flat spot on the end of the feed screw and ties the telescopic part 57 to the feed screw so that it will move therewith.

A knurled nut 66 is threaded on the feed screw 61 and projects upward through a slot in the sheet metal part 52 so as to be accessible at the top of the arm. Upon rotating the knurled nut 66, it presses against one or the other margin of the slot in the sheet metal part 52 so that the nut will rotate with respect to the feed screw 61 and move the telescopic part 57 with respect to the part 52 of the arm. The purpose of this telescopic arrangement of the parts of the arm will later appear.

The outer end of the telescopic part 57 has a cap 67 which has a substantially circular opening 68 which provides an area through which the drive belt may move without contact with metal surfaces. A tubular member 69 centrally located and supported by a fin to the upper side of telescopic part 57 provides the bearing support which permits a mounting block 71 and its rod 72 to be mounted in such a way that they may rotate through the required angle of movement. The rod 72 extends through the tubular member 69 and is held in position by a screw 73. Upon removal of the screw 73 the assembly may be removed from the dental arm 13.

The block 71 rotatably supports a pair of pulleys 74 one on each side of the block. For this purpose a shaft extends through the block and is fixed thereto. Suitable spacing washers are provided on each side of the pulleys permitting their free rotation. A cap 76 (Figs. 10 and 11) pivoted on the block 71 at 77 has an end wall 78 and a pair of spaced sidewalls 79 adapted to fit down over the outer sides of the pulleys 74 for the purpose of enclosing them and maintaining the drive belt or cord 81 in threaded relation to the pulleys. The cap 76 is held in position with respect to the block 71 by a spring clip which clips on the block 71. Upon the cap being swung to the position shown in Fig. 11 the drive belt 81 may be threaded over the pulleys 74 conveniently. The drive belt passes through the opening 68 in the cap 67.

One of the important aspects of my invention lies in the fact that the dental arm 13 and its appendages and the motor 12 and its supporting bracket 36 lie on opposite sides of the horizontal axis which may be considered the point 82 or the centers of the cap parts 34. The parts of the mechanism on opposite sides of the horizontal axis 82 thus substantially counterbalance each other and no auxiliary springs or weights are required.

The above described counterbalance is secured at least partly by reason of the fact that the motor is turned upside down which raises the level of the motor. The moment arm of the motor is such that substantially an equal counterbalance of the weights on opposite sides of the horizontal pivot point is secured when the weight of the arm and its appendages and the length of the arm are considered. The upside down position of the motor makes the counterbalancing effect of the motor average more nearly a constant since it varies from a minimum to a maximum and then back to a minimum as the arm swings from the position shown in Fig. 2 to and somewhat beyond the position shown in Fig. 1.

The upside down position of the motor brings the motor shaft and the drive pulley 83, rigidly mounted thereon, in a position such that it is approximately in alignment with the axis of the arm 13. It will further be observed that the grooves of the pulleys 74 and the grooves of the pulley 83 are in alignment with each other and pass approximately through the horizontal axis 82. This is important in maintaining the belt on the pulleys since a straight line drive is provided. It will further be observed from a comparison of Figs. 1 and 2, when the arm is shifted to its uppermost position by pivoting the arm around the axis 82, that the relationship of the pulley 83 and the pulleys 74 does not change. The drive belt 81 still passes approximately through the horizontal axis of rotation 82. Moreover throughout the limits of the movement of the arm the belt may freely pass through the hollow enclosure which defines the dental arm 13 as will be clear from an examination of Figs. 6 and 7.

Carried by the block 71 is a member 85 (Figs. 10 and 11) having an outer surface 86, formed on the arc of a circle to which a rod 87 is pivoted. The pivot is formed by a pin which extends through the member 85 which is bifurcated and receives an interfitting part of the rod (not shown). The various articulated joints between the end of the arm and the hand piece 16 have not been shown in detail since they are largely conventional. Details of the articulated joints and their associated parts will be given only where the structure of this invention departs from conventional constructions which have been on the market for a number of years. It will however be appreciated that the rod 87 is free to swing about the member 85 and the entire assembly is free to swing about the rod 72 as an axis.

The rod 87 is rigidly connected to a rod 91 which extends into a slidable sleevelike member 88 (Figs. 1 and 2) which has an opening 89 for the reception of the rod 91. The rod 91 has an opening (not shown) covered by the sleeve. Several sleeves like 88 are employed and one of these will be described later. The rod 91 carries a bracket 93 which rigidly supports a hook member 94 upon which the hand piece may be hung as is conventional practice and as shown in Fig. 2.

Figure 9:
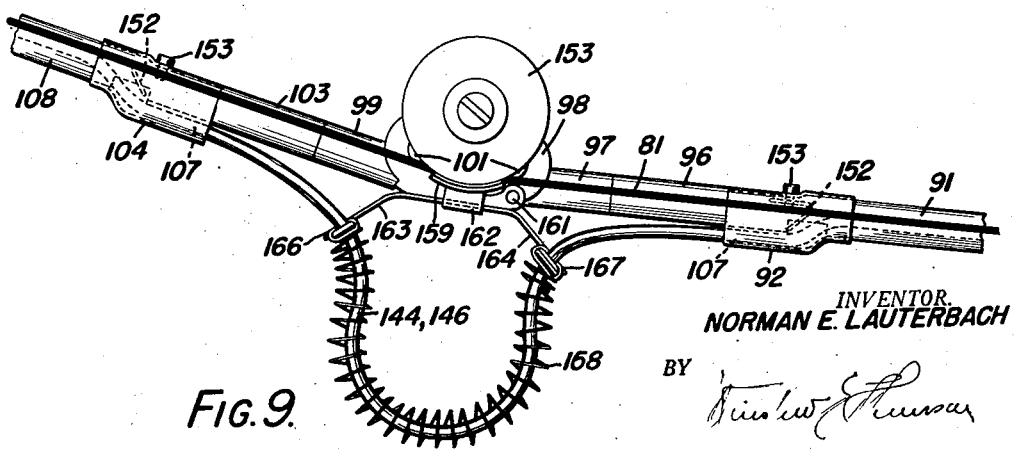
Fig. 9 is a view of the same parts shown in Fig. 8 with the arms pivoted from the position shown in that view.

Referring now to Figs. 8 and 9 a slidable sleeve 92 extends over an opening 90 in the rod 91 which opening is similar to the opening in the sleeve 88. The sleeve may be shifted along the rod 91 to expose the opening 90. As shown at 96 the rod 91 is solid and is connected to a rod 97. The rods 91 and 97 are connected together in any suitable manner whereby they may rotate with respect to each other. The end of the rod 97 is flattened and adapted to be received pivotally in the bifurcated part (not shown) of a block 98. The other side of the block carries a solid rod 99 which is of the same construction as the rod 97 and pivotally fitted to the block 98 in the same manner. The pivots for the rod 97 and 99 are indicated at 101. In a manner well known in the art, block 98 rotatably carries a pair of pulleys. The rod 99 is interfitted with a solid rod 103 so as to be rotatable with respect thereto. The rod 103 is solid adjacent its end and receives a sleeve 104 which may be slid on the rod to cover an opening indicated in dotted lines.

The sleeve 104 is similar to the sleeve 92 and similar to a sleeve 106 (Fig. 2). Each of the sleeves 88, 92, 104 and 106 has an opening 107 extending therethrough portions which are angularly extending with respect to each other, as indicated in dotted lines, for a purpose which will later appear. Between sleeves 104 (Fig. 8) and 106 (Fig. 2) the rod 103 is hollow as indicated at 108. A rod 109 rigidly secured to the rod 103 extends through a bracket 111. The bracket has a pair of openings 112 the purpose of which will later appear. The hand piece 16 and the manner of its support from the rod 109, together with the particular arrangement for driving the hand drill 17, need not be particularly described since hand pieces for dental drills are well known in the art and my present invention is not concerned with this part of the apparatus except insofar as the invention is concerned with means for bringing air and water to the hand piece.

Referring now to Fig. 4, the socket 23 has a pair of somewhat cone shaped bores 116 adapted to receive the correspondingly shaped ends of a pair of metal conduits or pipes. Pipe 117 is connected to a source of air supply and the pipe 118 is connected to a source of water supply, these sources of supply being located in the dental unit. Pipe 118 connects with a passage 119 formed in the socket 23. This passage opens into an annular groove 121 cut in the internal wall of the socket 23. The annular groove 121 connects with a radially extending passage 122 formed in the post 25 which opens into a longitudinal bore 123 cut axially in the post 25. The upper end of the axial bore 123 is of decreased diameter, as shown at 124, and is fitted with a tubular pipe 126 which connects with the bore 123. The pipe 126 is bent downward to overlie the plate 29 and then bent upward to form a free end as indicated at 127.

The pipe 117 for bringing air to the hand piece connects with a short radial bore 128 which connects with an annular groove 129 formed in the post 25. The annular groove 129 connects with a radial passage 131. The post 25 has an angularly extending bore 132 adapted to receive a pipe 133 which connects with the radial passage 131. The pipe 123 is bent over the plate 29 to parallel the pipe 126 and then bent upward to form a free end 134. The center post has an annular groove formed therein adapted to receive O ring packing 136 which maintains a sealing relationship between the annular grooves 121 and 129.

Figure 3:
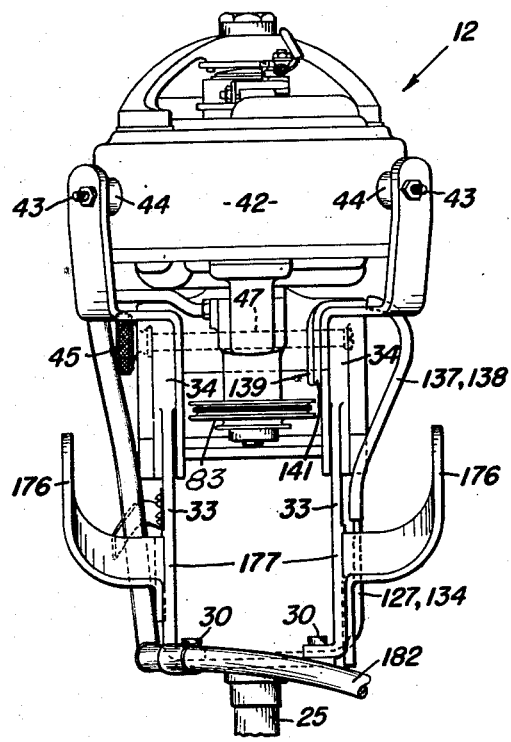
Fig. 3 is a rear view of the dental engine or motor showing how the motor is supported, showing the pulley for driving the belt for the drill and the connections for delivering air and water to the hand piece with the cover or hood removed.

Referring now to Fig. 3 the free ends of the tubular conduits 127 and 134 are connected to flexible tubular members 137 and 138. These flexible members may be made of plastic materials or any other suitable flexible material. They provide a non-rigid connection between the free ends 127 and 134 of the metal pipes 126 and 133 and pipes 139 and 141 (see also Fig. 6) to which they are connected whereby the dental arm may be swung around the horizontal axis and the flexible plastic tubular member 137 and 138 will flex to allow this movement. The metal tubes 139 and 141 extend downward (Fig. 7) between the forwardly extending parts 37 of motor bracket 36 and then forwardly through the hollow dental arm to the outboard end thereof where they extend through the opening 68 in the cap 67. The two metal tubes 139 and 141 are soldered to the support 63 (Fig. 6) struck up from the sheet metal of the telescopic part 57 of the dental arm. Now it will be clear that as the finger piece 66 is actuated, the metal tubes 139 and 141 move with the telescopic part 57 and with respect to the fixed part 52 of the arm. It will be understood that the flexible connections 137 and 138 permit this telescopic movement.

The ends of the metal tubes 139 and 141 are shown at 142 and 143 (Fig. 6). These projecting ends are adapted to receive flexible tubes which may be of plastic or any other suitable material. As shown in Figs. 1 and 2, the flexible tubes 144 and 146 extend around the pivot between the solid rod 87 and the end of the block 71 into and through the fitting 88, through the hollow rod 91, into the fitting 92 and then exteriorally with respect to the rods 96, 97, 99 and 103 (Figs. 9 and 10) and around the block 98 between the arms 97 and 99. The flexible tubes 144 and 146 from thence extend through the fitting 104 and through the hollow rod 108.

The flexible tubes emerge from the fitting 106 and are connected into the bracket 111 which has the pair of openings 112 therein for their reception. A fitting 147 has a pair of metal tubular ends extendinng therefrom which may be fitted into the ends of the openings in the bracket 111. The tubes formed in the fitting are connected with flexible tubes 148 and 149, which through a pair of metal nozzles, as shown at 151, deliver air and water to the hand pieces. A bail 150 holds the fitting 147 on the bracket 111 and provides a key to assure correct assembly.

As shown most clearly in Figs. 7 and 8 each of the fittings, for example, the fittings 92 and 104 has a bent piece of metal 152 held in position by a screw 153. The bent piece of metal serves to guide the tubes as they are fed through the hollow rod and the fittings as will be apparent from an examination of Figs. 7 and 8.

As will be apparent from an examination of the drawings, the drive belt 81 extends around the pulley 83 (Figs. 2 and 3), thence through the hollow dental arm (see Figs. 6 and 7); then outward through the opening 68 in the cap 67; then around pulleys 74 (see Fig. 11); and thence around pulleys 153 carried by the block 98. From the pulleys 153 the drive cable extends over pulleys 154 and around a pulley 156 which drives the dental drill shaft located in the hand piece.

From what has been previously stated it will be clear that the appendages from the block 71 (Fig. 1) may swing around the rod 72 and may swing around the member 85 (Fig. 10) and the rods 91 and 108 may swing with respect to each other as will be evident from a comparison of Figs. 8 and 9. In addition, rods 96 and 97 may pivot with respect to each other as may the rods 99 and 103. In addition as is conventional practice the hand piece 16 may swing around the axis of the pulleys 154. The articulation of these joints which occurs during normal use of the apparatus by the dentist may cause the drive belt to engage the flexible tubes and sever them. To prevent contact between the flexible tubes and the drive belt and avoid any abraiding or cutting action, each of the flexible tubes as they emerge from the outboard end of the arm is protected by a helically coiled spring 158. These springs encircle the flexible tubes from the point where they emerge from the arm to the point where they enter the fitting 88 as will be clear from an examination of Figs. 1 and 2. The springs hold the flexible tubes extended and away from the drive belt.

As shown most clearly in Figs. 7 and 8, the pulleys 153 are provided with a guard 159 which is pivoted at 161. Upon shifting or rotating the guard around the pivot 161, the pulleys 153 are exposed for the reception of the drive belt 81. The guard 159 carries a bracket 162 from which a pair of arms 163 and 164 extend. At their ends the arms 163 and 164 carry slotted clips 166 and 167. These clips are adapted to receive the ends and last coils of springs 168 which are helically coiled around each of the tubes.

It will now be clear from an examination of Figs. 7 and 8, that no matter what the position of the arms 91 and 108 with respect to each other, the springs 168 maintain the flexible tubes away from the drive belt 81 and prevent severing of the tubes. The flexible tubes 148 and 149 carried by the hand piece are also each encircled by a helical spring 169 so that the hand piece may be freely used by the dentist without danger of the drive belt engaging the tubes and damaging them.

The hood or cap 50 previously mentioned is dome shaped and has a cut out 171 in its forward wall the side edges of which straddle the cap shaped members 34 of the cradle 31. The lower part of the hood has a part 172 somewhat larger in crosssectional area to form a ledge 173 which rests, as shown at 174 and partly wedged on a pair of arms 176. The arms 176 are carried, as shown at 177, by the cradle 31 and is entirely free of the motor. The lower edge of the hood overlaps the upper lip 178 of a skirt 179 mounted on the top of the dental unit as shown at 181.

A consideration and comparison of Figs. 1 and 2 shows when the dental arm and motor are swung about the horizontal axis 82, that the hood 50 remains stationary. Sufficient space is provided in the hood due to the upside down position of the motor and the location of the pulley 83 below the motor to enable the shifting of the motor from the position shown in Fig. 2 to that shown in Fig. 1, without moving the hood. When the dental arm is swung about the vertical axis, the hood being supported on arms 176 which are carried by the cradle 31, rotates about the vertical axis.

It will be particularly noted that the horizontal axis 82 is adjacent the forward edge of or outside of the hood which avoids the necessity of moving the hood universally and enables a minimum opening in the hood since the margins of the opening may be in close relation to the part forming the horizontal axis. Of particular importance is the fact that this arrangement of parts brings the finger device for applying friction at the horizontal pivot in a position, as shown in Fig. 2, accessible to the dentist without removing the hood. The arrangement of parts shown also brings the pulley within the hood. With the pulley 83 below the motor should the drive belt become disengaged from the pulley it will usually drop clear and not wrap around the motor drive shaft. The hood may be removed to enable access to the motor and its associated part without the removal of any screws merely by lifting the hood upward. It is not essential that the horizontal pivot be outside the hood so long as it is close to the wall thereof so that finger device may be outside the hood.

In the drawings I have shown certain electrical connections 182 to the motor and electrical connections 183 to a pair of switches 184, Figs. 1, 2 and 6, but these do not constitute any part of my present invention and need not be further described. Upon lessening the electrical connections 182 from the terminal block 186 the entire assembly of motor and dental arm may be lifted out of the socket 24. One of the important advantages of the upside down arrangement of the motor is that this brings the motor brushes 185 at the top of the motor so that they are accessible for replacement by the dentist merely by removing the cover.

Although a single embodiment of the invention has been illustrated and described, it is to be understood that the invention is not limited thereto as various changes in the construction and arrangement of parts may be made without departing from the spirit of the invention, as will be apparent to those skilled in the art and reference will be had to the appended claims for a definition of the limits of the invention.

I claim:

1. A dental drilling unit adapted to be mounted adjacent the top of a dental equipment stand comprising in combination, a vertically extending pivot carried by the stand, a carrier mounted on said pivot, a horizontally extending pivot supported by said carrier, an assembly comprising a dental arm having appendages including a rotary drill, a support bracket and a motor mounted on said support bracket, said assembly being pivotally mounted on said horizontal pivot in such manner that the support bracket and motor counterbalance the dental arm and its appendages and a cover for enclosing the motor and its support bracket, said cover being supported by the carrier whereby it rotates therewith about the vertical pivot but being free of the support bracket and motor whereby the support bracket and motor are free to oscillate therein about the horizontal pivot without moving the cover.

2. A dental drilling unit in accordance with claim 1 wherein the dental arm is hollow and the horizontal pivot comprises two spaced members the space between which communicates with said hollow dental arm, said motor having a pulley mounted on its drive shaft and a drive belt driven by said pulley, extending between said spaced members and through said dental arm to said rotary drill.

3. A dental drilling unit in accordance with claim 1 in which the horizontal pivot comprises two spaced members, the cover has a sidewardly extending opening through which said spaced members extend so that the horizontal pivot is adjacent the wall of the cover and the dental arm is hollow whereby a drill drive belt driven by the motor may extend from within the cover between said spaced members and through said hollow dental arm to the drill.

4. A dental drilling unit adapted to be mounted adjacent the top of a dental equipment stand comprising, in combination, an assembly which includes a hollow dental arm having appendages including a rotary drill, a support bracket and a motor mounted on said support bracket, means including a horizontal pivot for mounting said assembly so that the dental arm and its appendages are approximately counterbalanced by the motor and its support bracket, a pulley driven by said motor, pulley means mounted on the outboard end of said arm, a drive belt driven by said motor pulley, said drive belt extending from said motor pulley in a straight line to the outboard pulley means and the portions of said drive belt between said pulley and pulley means passing approximately through the axis of the horizontal pivot and through said hollow dental arm in all possible positions of adjustment of said assembly about said horizontal pivot and means for mounting said assembly for swinging movement about a vertical axis.

5. A dental drilling unit in accordance with claim 4 wherein a cover extends down over the motor and its support bracket and means are provided for supporting the cover for swinging movement with said assembly about the vertical pivot, said cover being free to the motor and its support bracket whereby they may freely oscillate within the cover about the horizontal pivot.

6. A dental drilling unit in accordance with claim 4 wherein a cover extends down over the motor and its support bracket and has a side opening through which the horizontal pivot extends and finger operated means are provided external of the cover for varying the friction between said horizontal pivot and said assembly.

7. A dental drilling unit adapted to be mounted adjacent the top of a dental equipment stand comprising, in combination, an ssembly which includes a dental arm having appendages including a rotary drill, a support bracket and a motor having a shaft mounted on said support bracket, a pulley secured to said motor shaft, said motor being mounted on said support bracket in a position such that the pulley is below the motor and means for mounting said assembly for swinging movement about both a vertically extending and a horizontally extending pivot.

8. A dental drilling unit in accordance with claim 7 in which the horizontally extending pivot comprises a pair of spaced members and the arm is hollow and communicates with the space between said members, said assembly being mounted on said spaced members so that the arm and its appendages are counterbalanced by the support bracket and motor, the outboard end of said arm having pulley means and the unit being provided with a drive belt for the rotary drill which passes over said pulley and said pulley means, between said spaced members and through said hollow arm.

9. A dental unit in accordance with claim 7 wherein the arm and its appendages are mounted on one side of the horizontal pivot and the support bracket and motor on the other side thereof, said motor being mounted with reference to the horizontally extending pivot in a position such that in swinging the assembly about the horizontal pivot, the center of gravity of the motor swings from a position above the horizontal to a position below the horizontal.

10. A dental drilling unit adapted to be mounted adjacent the top of a dental equipment stand comprising, in combination, a hollow dental arm having appendages including a rotary drill, a motor having a pulley mounted thereon, means for counterbalancing said arm and appendages, means for supporting said arm for rotation about both a vertical and a horizontal axis, pulley means at the outboard end of said motor, a drive belt extending over said pulley and pulley means and extending through said hollow arm and means extending through said hollow arm for conveying fluid from the equipment stand to the rotary drill.

11. A dental drilling unit adapted to be mounted on a support comprising, in combination, a tubular arm extending outward from said support, means for pivoting said arm on the support so that the arm may swing in both a horizontal and a vertical plane, a dental hand piece including a rotatable drill, a plurality of tubular extention rods between the extended end of said arm and the hand piece, means for pivoting said rods with respect to each other and with respect to the extended end of the arm and the hand piece, and tubular means at least parts of which are flexible for conveying fluid to the hand piece from said support, said tubular means extending through said tubular arm and through said tubular rods and externally around said pivot means.

12. A dental drilling unit in accordance with claim 11 in which said tubular arm comprises two telescopic parts and means are provided for telescoping said parts with respect to each other.

13. A dental drilling unit in accordance with claim 11 wherein a flexible belt and pulleys over which the belt passes are provided for rotating the drill, said belt extending through said tubular arm and said arm comprising two telescopic parts which may be telescoped with respect to each other to adjust the tension of the belt.

14. A dental drilling unit in accordance with claim 11 in which a set of pulleys is provided at each pivot means over which a flexible movable belt for rotating the drill passes and means are provided which extend around said flexible tubular means at the portions thereof which are external for protecting said flexible tubular means from being rubbed by the belt.

15. A dental drilling unit adapted to be mounted on a support comprising, in combination, an arm extending outward from said support, means for pivoting said arm on the support so that the arm may swing in both a horizontal and a vertical plane, a dental hand piece including a rotatable drill, a plurality of rods between the extended end of the arm and the hand piece articulated with respect to each other and with respect to the arm and the hand piece, tubular means for conveying fluid to the hand piece, the horizontal pivot for said arm comprising a rotatable member extending upward through said support and fluid connecting means for conveying fluid from a source of supply within the support, said rotatable member having passageway means in fluid communication with said connecting means and said tubular means.

16. A dental drilling unit in accordance with claim 15 in which said tubular means comprises two tubular members one for air and the other for water, said connecting means includes two tubular members one for air and the other for water and said passageway means includes a passageway connected at its ends to the tubular member and connecting means for water and a second passageway connected at its ends to the tubular member and connecting means for air.

17. A dental drilling unit in accordance with claim 15 in which said arm is tubular, said tubular means extends through the tubular arm and at least a portion of said tubular means between said passageway and said arm is flexible.

18. A dental drilling unit adapted to be mounted on a support comprising, in combination, a hollow arm having an inboard and an outboard end, appendages including a dental drill carried by said outboard end, a horizontally extending pivot at the inboard end of said arm, means on the other side of said horizontally extending pivot for counterbalancing the weight of said arm and its appendages, fluid supply means carried by said support, conduit means extending from said fluid supply means through said hollow arm to the outboard end thereof and being carried by said appendages and means enabling rotation of said arm in a horizontal plane.

19. A dental drilling unit in accordance with claim 18 wherein said appendages include tubular members pivotally connected to each other and said conduit means extends through said tubular members.

20. A dental drilling unit adapted to be mounted upon a support comprising, in combination, a dental handpiece including a dental drill, at least one pair of elements articulated with respect to each other by which said handpiece is carried, a hollow dental arm extending from said support having an outboard and an inboard end, means for supporting said elements from the outboard end of the arm, means for swinging said arm about both a horizontal and a vertical axis and conduit means for fluid extending from said support through said hollow arm from the inboard end to the outboard end, said conduit means being carried by said element and extending to the handpiece.

21. A dental drilling unit in accordance with claim 20 in which said elements are hollow and said conduit means extends through said elements.

22. A dental drilling unit adapted to be mounted on a support comprising, in combination, an assembly comprising motor means, a hollow arm having an inboard and outboard end and having appendages including a dental drill depending from the outboard end, a horizontally extending pivot between the inboard end of said arm and said motor means whereby said motor means approximately counterbalances said arm and its appendages during movement of said arm in a vertical plane about said horizontally extending pivot, means enabling rotation of said arm in a horizontal plane means carried by said appendages for driving said drill, said means extending through said hollow arm and being connected to said motor means, fluid supply means carried by said support adapted to supply coolant to the drill and conduit means for said coolant extending from said fluid supply means through said hollow arm, said conduit means being carried by said appendages and extending to a position adjacent said drill.

References Cited in the file of this patent
UNITED STATES PATENTS 2,419,370     Roof _____ Apr. 22, 1947